United States Patent [19]

Hahn et al.

[11] 4,272,583

[45] Jun. 9, 1981

[54] FLAMEPROOFED EXPANDABLE STYRENE POLYMERS

[75] Inventors: Klaus Hahn, Lampertheim; Herbert Naarmann, Wattenheim; Klaus Penzien, Frankenthal; Heinz Weber, Gruenstadt, all of Fed. Rep. of Germany

[73] Assignee: BASF Aktiengesellschaft, Del.X

[21] Appl. No.: 170,521

[22] Filed: Jul. 21, 1980

Related U.S. Application Data

[63] Continuation-in-part of Ser. No. 10,727, Feb. 8, 1979.

[30] Foreign Application Priority Data

Mar. 8, 1978 [DE] Fed. Rep. of Germany ....... 2809979

[51] Int. Cl.$^3$ .................................................. C08J 9/22
[52] U.S. Cl. .............................. 428/407; 260/45.7 R; 260/45.8 NT; 260/45.85 N; 260/45.9 R; 260/45.9 KA; 260/DIG. 24; 521/56; 521/87; 521/88; 521/90; 521/95; 521/96; 521/98; 521/57; 521/146; 521/907; 260/45.95 G
[58] Field of Search ................. 521/57, 56, 87, 88, 521/90, 95, 96, 98, 907; 260/45.7 RL, 45.8 NT, 45.9 R, 45.9 KA, DIG. 24; 428/407

[56] References Cited

U.S. PATENT DOCUMENTS

| | | | |
|---|---|---|---|
| 3,058,926 | 10/1962 | Eichhorn | 260/45.7 RL |
| 3,058,927 | 10/1962 | McMaster et al. | 260/45.7 RL |
| 3,445,404 | 5/1969 | Roden et al. | 260/45.7 RL |
| 3,455,873 | 7/1969 | Jenkner | 521/57 |
| 3,826,766 | 7/1974 | Howell et al. | 521/57 |
| 4,049,622 | 9/1977 | Fleig | 260/45.85 N |
| 4,086,191 | 4/1978 | Hinselmann et al. | 521/57 |

FOREIGN PATENT DOCUMENTS

1170960 11/1969 United Kingdom.

*Primary Examiner*—Morton Foelak
*Attorney, Agent, or Firm*—Keil & Witherspoon

[57] ABSTRACT

Particulate expandable styrene polymers which contain an organic bromine compound as the flameproofing agent and an organic compound possessing a labile C—C, O—O or N=N bond as the synergistic agent for flameproofing. The flameproofing agent is applied to the surface of the particles while the synergistic agent is homogeneously incorporated into the particles.

The polymers can be converted to self-extinguishing foams.

6 Claims, No Drawings

FLAMEPROOFED EXPANDABLE STYRENE POLYMERS

This is a continuation-in-part of application Ser. No. 10,727, filed Feb. 8, 1979.

It is known that expandable styrene polymers may be flameproofed by means of organic bromine compounds. Normally, the latter are homogeneously distributed in the styrene polymer. This may be effected, for example, by preparing the sytrene polymer by polymerizing the monomer in the presence of the bromine compound, or by subsequently impregnating the styrene polymer, as a melt, in solution or in aqueous suspension, with the bromine compound.

British Pat. No. 1,170,960 discloses styrene polymer particles having an organic bromine compound on the surface of the particles, applied thereon by tumbling, a blowing agent and a styrene polymerization catalyst which is an organic compound containing a labile O—O bond or N=N bond. The latter compounds are peroxy compounds such as cumene hydroperoxide, benzoyl peroxide, acetyl benzoyl peroxide and azo compunds such as azobisisobutyronitrile. The half lives of the aforesaid four compounds range from 8 minutes to 115 minutes.

U.S. Pat. Nos. 3,058,926, 3,058,928 and 3,058,929 disclose that the flame-retardant action of bromine compounds can be boosted substantially if they are used conjointly with an organic peroxide, i.e. with a compound which contains a labile O—O bond. Compounds containing labile C—C and N=N bonds act similarly.

Since the presence of relatively large amounts of bromine compounds in the styrene polymers has an undesirable effect on the properties of the product and on the processing characteristics, and since furthermore various bromine compounds interfere with the polymerization of styrene, attempts have already been made to apply the flameproofing agent to the surface of the expandable styrene polymer. However, this method has the fundamental disadvantage that the surface coating reduces the mechanical strength and welding of foams produced from expandable styrene polymers. British Pat. No. 1,199,591 proposes improving the adhesion of the flameproofing agent to the styrene polymer particles by applying the bromine compound and the organic peroxide conjointly with a binder possessing adhesive properties onto the surface of the particles. However, this complicated procedure has not found acceptance.

Recently, bromine compounds which act as flameproofing agents even when used in very small amounts have been disclosed. It was to be expected that even if such flameproofing agents were applied to the surface of the expandable styrene polymer particles, the adverse effect on the mechanical properties of the foams produced from the particles would not be very pronounced. Such molding compositions are described, for example, in U.S. Pat. No. 4,049,622. However, even in these cases it remained necessary further to reduce the amount of flame-proofing agent applied to the surface, without reducing the flameproofing action. It has been found that this cannot be achieved by simply admixing a synergistic agent to the organic bromine compound in the conventional manner. It is true that the amount of bromine compound can thereby be reduced, but the total amount of surface coating remains approximately the same so that nothing is gained.

We have found that the above object can be achieved, according to the invention, if the flameproofing agent is applied to the surface of the styrene polymer particles whilst the synergistic agent is homogeneously incorporated into the particles.

Surprisingly, the synergistic effect is fully retained under these conditions, though the bromine compound and synergistic agent are spatially separate from one another. If the synergistic agent is added in accordance with the invention, substantially less of the expensive bromine compound is required to achieve the same flameproofing action. Furthermore, substantially less surface coating suffices, so that the mechanical strength of foams produced from the expandable styrene polymers is better. Finally, the undesirable abrasion of the surface coating of the styrene polymer particles, which is virtually unavoidable during processing and transportation, is reduced. These advantages also apply in comparison with a method in which the flameproofing agent and synergistic agent are conjointly applied to the surface of the styrene polymer particles.

Suitable styrene polymers are polystyrene and copolymers of styrene with up to 50 percent by weight of comonomers. Examples of suitable comonomers are α-methylstyrene, acrylonitrile, and esters of acrylic acid or methacrylic acid with alcohols of 1 to 8 carbon atoms. High-impact polystyrenes, produced by polymerizing styrene, with or without acrylonitrile, in the presence of rubbery butadiene polymers, may also be used.

The blowing agents contained in the polymers are preferably liquid or gaseous organic compounds which do not dissolve the polymer and which boil below the softening point of the polymer, for example aliphatic or cycloaliphatic hydrocarbons, e.g. propane, butane, pentane, hexane, heptane and cyclohexane, or halohydrocarbons, e.g. methyl chloride, dichlorodifluoromethane or 1,2,2-trifluoro-1,1,2-trichloroethane. Advantageously, from 3 to 10 percent by weight of blowing agent, based on styrene polymer, are used. Further details may be found in the Kunststoffhandbuch, volume V, "Polystyrene", Carl-Hanser-Verlag, Chapter 6, "Polystyrol-Schaumstoffe", especially pages 679–688.

The styrene polymers are in particle form, the particle size advantageously being from 0.1 to 6.0 mm, especially from 0.4 to 3 mm.

In principle, suitable flameproofing agents are all the relevant conventional organic bromine compounds, preferably with a bromine content of more than 50%. Preferred compounds are:

2,5-bis-(tribromomethyl)-1,3,4-thiadiazole (A₁)

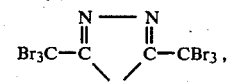

1,1,2,3,4,4-hexabromobut-2-ene (A₂)

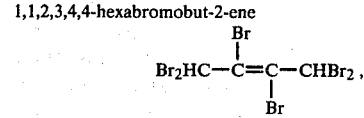

pentabromophenyl allyl ether (A₃)

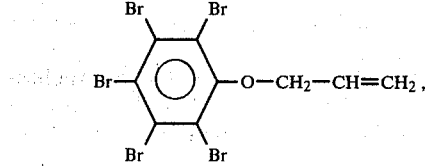

-continued 2,4,6-tris-(tribromomethyl)-1,3,5-triazine  (A4)

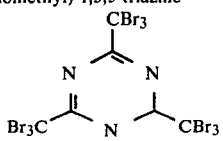

1,2,5,6,9,10-hexabromocyclododecane  (A5)

Pentabromomonochlorocyclohexane  (A6).

Another class of preferred bromine compounds comprises brominated ketones which contain at least one

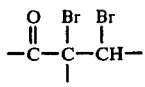

group in the molecule and bear at least one phenyl substituent which is preferably substituted. Chlorinated products have been found to have particularly good infrared stability.

Preferred brominated ketones are tetrabromodibenzal acetone  (A7)

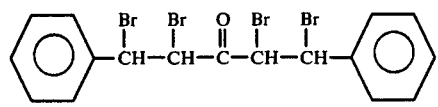

tetrabromodi-(4-chloro)-benzal acetone  (A8)

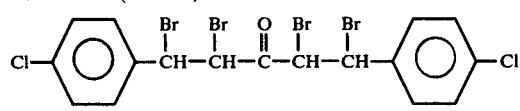

tetrabromodi-(2,4-chloro)-benzal acetone  (A9)
and
tetrabromo-4-chloro-benzal acetone  (A10)

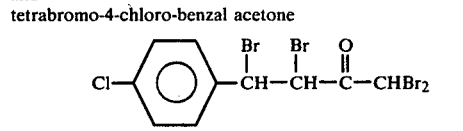

We have found that bromine compounds in which the elimination of a bromine atom is activated by a C=C or C=N group in the molecule are particularly effective.

The bromine compounds are preferably employed in an amount of from 0.01 to 2, especially from 0.05 to 0.5, parts by weight, per 100 parts by weight of the uncoated expandable particles.

Organic compounds possessing labile C—C, O—O and N=N bonds may be used as synergistic agents. Their decomposition half-life, measured at 100° C. in benzene, should preferably be more than 2 hours, in particular more than 5 hours.

Examples of suitable synergistic agents possessing a labile O—O bond are organic peroxides and hydroperoxides, as described, for example, in U.S. Pat. No. 3,058,926, column 3, line 38 to column 4, line 47. Dicumyl peroxide, ditert.-butyl peroxide and α,α'-bis-(tert.-butylperoxy)-diisopropylbenzene are particularly preferred.

Examples of suitable synergistic agents possessing a labile C—C bond are dicumyl and diisopropylbenzene oligomers, as described in German Published Applications DAS No. 1,255,302, DAS No. 1,272,533 and DAS No. 2,338,709, as well as 1,1'-diphenylbicyclohexyl and 1,1'-diphenylbicyclopentyl as described in German Published Application DAS No. 2,525,697.

Examples of suitable synergistic agents possessing a labile N=N bond are, azodiisocyclohexanonitrile and 2,2-dimethyl-(2,2-azobutane) as described in British Pat. No. 1,015,217 and in German Laid-Open Application DOS No. 2,320,535.

The above preferred synergistic agents are distinguished by the fact that they do not interfere with the polymerization of styrene. They also do not have an adverse effect on the product properties and processing characteristics of the expandable styrene polymers and do not interfere with the cell structure of the foams produced from the polymers.

The synergistic agents are preferably incorporated into the expandable particles in an amount of from 0.01 to 1.0, especially from 0.03 to 0.5, % by weight.

The synergistic agent may be incorporated into the styrene polymer particles in various ways. It may be added to the polymerization batch, when producing the styrene polymers by polymerizing the monomers, and such addition can be effected before, during or toward the end of the polymerization cycle. The synergistic agent undergoes virtually no decomposition at the conventionally used temperatures of from about 100° to 120° C. and polymerization times of from about 2 to 12 hours, so that it persists in the finished particles and can become effective therein. Another possible method is to add the synergistic agent to a melt of the styrene polymer, for example by co-extrusion. Finally, the styrene polymer particles can also be impregnated with the synergistic agent, where appropriate conjointly with the blowing agent, in aqueous suspension at an elevated temperature.

The bromine compound is applied to the styrene polymer particles, containing the blowing agent and synergistic agent, by surface coating, for example by simple tumbling.

In some cases it can be advantageous to coat the expandable particles additionally with conventional agents for reducing the mold dwell time, for example with glycerol monostearate or with urethanes. To prevent caking or sticking-together of the coated particles during further processing, it is advantageous additionally to apply anti-tack agents to the particles. Finely divided silica is particularly suitable for this purpose and is preferably employed in an amount of from 0.005 to 0.1 part by weight, per 100 parts by weight of the expandable styrene polymer. Silica has the advantage that it does not have an adverse effect on the flame-retardant action of the organic bromine compounds. However, in principle, other conventional anti-tack agents, e.g. zinc stearate, may also be employed. A further suitable anti-tack agent is calcium carbonate. In addition, we have found that this compound, as well as other salts, oxides and hydroxides of alkaline earth metals, prevent the bromine compounds from causing corrosion of processing machinery. It is advantageous to add light stabilizers when coating the styrene polymer particles with flameproofing agents. N-Hydroxyphenylbenzotriazoles or hydroxybenzophenones, which may or may not be mixed with sterically hindered phenols and/or dialkyl-tin dicarboxylates, have proved particularly suitable for this purpose.

The stabilizers are preferably employed in an amount of from 0.005 to 1.0 part by weight per 100 parts by weight of the uncoated particles.

The molding compositions may contain yet further constituents, for example fillers, colored pigments, lubricants, antistatic agents, aging retarders or foaming promoters.

The molding compositions according to the invention can be used for the production of self-extinguishing foams having a density of from 5 to 100 g/l, preferably from 10 to 50 g/l. Foaming takes place through expansion of the blowing agent at elevated temperatures, for example as a result of sintering in molds, or of extrusion.

In the Examples, parts and percentages are by weight.

EXAMPLE 1

(a) Polymerization

A mixture of 150 parts of water, 0.1 part of sodium pyrophosphate, 100 parts of styrene, 7 parts of n-pentane, 0.45 part of benzoyl peroxide and 0.15 part of tert.-butyl perbenzoate (the latter two compounds as polymerization initiators) and 0.1 part of various synergistic agents was heated, with stirring, at 90° C. in a pressure-resistant stirred stainless steel kettle. After 2 hours at 90° C., 4 parts of a 10 percent strength aqueous solution of polyvinylpyrrolidone were added. The mixture was then stirred for a further 2 hours at 90° C., thereafter for 2 hours at 100° C., and finally for 2 hours at 120° C. The resulting granules, having a mean particle diameter of 1.5 mm, were isolated and dried.

(b) Coating 100 parts of the expandable polystyrene granules were coated by tumbling for three minutes in a paddle mixer with various amounts of various flameproofing agents as well as with 0.4 part of glycerol monostearate and 0.1 part of a stabilizer mixture comprising 73% of 2-(2-hydroxy-3,5-ditert.-butylphenyl)-5-chlorobenzotriazole, 15% of 1,6-hexanediol bis-3-(3,5-di-tert.-butyl-4-hydroxyphenyl)-propionate and 12% of dibutyl-tin dilaurate.

(c) Production of the foam

The expandable coated polystyrene particles were foamed by steam treatment and after one day's storage were molded into foam blocks by further steam treatment in a closed mold.

(d) Testing

Strips of size 2×20×40 cm were cut from the foam blocks by means of a heated wire. The time for which the strips continued to burn was measured on strips inclined at 45°, which were ignited at the bottom end by means of a luminous natural gas flame. The time required for the flame to go out was measured and the mean value was determined from 20 individual measurements.

The results are shown in the Table.

TABLE

| Experiment | Synergistic agent | Flameproofing agent parts | Flameproofing agent type | Burning time sec. |
|---|---|---|---|---|
| 1 | DCP | 0.05 | $A_1$ | 5.3 |
| 2 | DCP | 0.1 | $A_1$ | 2.4 |
| 3 | DCP | 0.2 | $A_1$ | 0.9 |
| 4 | DTP | 0.1 | $A_1$ | 4.4 |
| 5 | DC | 0.1 | $A_1$ | 4.7 |
| 6 | DCP | 0.2 | $A_2$ | 1.8 |
| 7 | DCP | 0.4 | $A_3$ | 1.8 |
| 8 | DCP | 0.1 | $A_4$ | 2.0 |
| 9 | DCP | 0.6 | $A_5$ | 4.8 |

DCP means dicumyl peroxide
DTP means di-tert.-butyl peroxide
DC means dicumyl
$A_1$–$A_5$ are the flameproofing agents listed in the description.

EXAMPLE 2

Particles of expandable polystyrene containing 7% of pentane and, incorporated into the particles, 0.05% of α, α'-bis(tert-butylperoxy) diisopropylbenzene are coated in a paddle agitator with 0.4% of glycerol monostearate and 0.4% of bromine compound A 10. The particles are foamed and welded into a block of density 10 g/l. Specimens tested for fire resistance according to DIN 4102 passed both the B1 and the B2 conditions. A test for infrared stability involving exposing a foam strip 0.4×8×40 cm to a flat-plate exposure unit for 70 hours resulted in only a very slight drop in the viscosity number.

We claim:

1. A particulate expandable styrene polymer which comprises: styrene polymer particles containing from 0.01 to 2.0 parts by weight based on 100 parts by weight of the particles of an organic bromine compound as a flameproofing agent on the surface of the particles, said flameproofing agent being applied to the particles by tumbling whereby said flameproofing agent is restricted to the surface areas of the particles, said particles further containing (a) from 3 to 10 percent by weight of a liquid or gaseous organic blowing agent which does not dissolve the polymer and which boils below the softening point of the polymer and (b) from 0.01 to 1.0% by weight of an organic synergistic flame-proofing agent containing a labile C—C, O—O or N=N bond and having a decomposition half-life, measured at 100° C. in benzene, of more than 5 hours, said blowing agent and said synergistic flameproofing agent being homogeneously dispersed throughout the particles.

2. A particulate expandable styrene polymer as claimed in claim 1, wherein the flameproofing agent is 2,5-bis(tribromomethyl)-1,3,4-thiadiazole, 1,1,2,3,4,4-hexabromobut-2-ene, pentabromophenyl allyl ether, 2,4,6-tris(tribromomethyl)-1,3,5-triazine, 1,2,5,6,9,10-hexabromocyclododecane or pentabromomonochlorocyclohexane.

3. A particulate expandable styrene polymer as claimed in claim 1, wherein the flameproofing agent is a brominated ketone which contains at least one

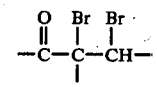

group in the molecule and bears at least one phenyl substituent which is preferably substituted.

4. A particulate expandable styrene polymer as claimed in claim 1, wherein the synergistic agent is dicumyl peroxide, di-tert.-butyl peroxide,α,α'-bis-(tert.-butyl-peroxy)-diisopropylbenzene, dicumyl, an isopropylbenzene oligomer, azodiisocyclohexanonitrile or 2,2-dimethyl-(2,2-azobutane).

5. A particulate expandable styrene polymer as claimed in claim 1, wherein the particles are coated not only with the flameproofing agent but also with a stabilizer and/or an anti-tack agent and/or agents for reducing the mold dwell time.

6. A particulate expandable styrene polymer as claimed in claim 1, wherein the particles have a diameter of from 0.1 to 6 mm.

* * * * *